United States Patent
Wass et al.

(10) Patent No.: US 12,451,554 B2
(45) Date of Patent: Oct. 21, 2025

(54) CASING FOR ELECTRIC BATTERY

(71) Applicant: Stark Future, S.L., Sitges (ES)

(72) Inventors: Anton Wass, Sitges (ES); Paul Soucy, Sitges (ES)

(73) Assignee: Stark Future, S.L., Sitges (ES)

( * ) Notice: Subject to any disclaimer, the term of this patent is extended or adjusted under 35 U.S.C. 154(b) by 531 days.

(21) Appl. No.: 17/903,317

(22) Filed: Sep. 6, 2022

(65) Prior Publication Data

US 2023/0187764 A1 Jun. 15, 2023

(30) Foreign Application Priority Data

Dec. 10, 2021 (ES) .............................. ES202132432

(51) Int. Cl.
*H01M 50/271* (2021.01)
*H01M 10/613* (2014.01)
*H01M 10/625* (2014.01)
*H01M 10/643* (2014.01)
*H01M 10/653* (2014.01)
(Continued)

(52) U.S. Cl.
CPC ....... *H01M 50/271* (2021.01); *H01M 10/613* (2015.04); *H01M 10/643* (2015.04); *H01M 10/653* (2015.04); *H01M 50/213* (2021.01); *H01M 50/224* (2021.01); *H01M 50/291* (2021.01); *H01M 50/293* (2021.01); *H01M 50/588* (2021.01); *H01M 50/593* (2021.01); *H01M 10/625* (2015.04); *H01M 50/249* (2021.01)

(58) Field of Classification Search
CPC ............. H01M 50/213; H01M 50/289; H01M 50/291; H01M 50/293; H01M 50/224; H01M 50/588; H01M 50/242
See application file for complete search history.

(56) References Cited

U.S. PATENT DOCUMENTS

| 2010/0151314 | A1* | 6/2010 | Turbe | H01M 50/267 |
| | | | | 429/159 |
| 2012/0231309 | A1* | 9/2012 | Itoi | H01M 10/613 |
| | | | | 429/99 |

(Continued)

FOREIGN PATENT DOCUMENTS

CN 113764798 A * 12/2021 .......... H01M 10/613

OTHER PUBLICATIONS

Brittanica definition of the term "slot". (Year: unknown).*
Machine Translation of CN-113764798-A (Year: 2021).*

*Primary Examiner* — Gregg Cantelmo
(74) *Attorney, Agent, or Firm* — MaxGoLaw PLLC

(57) ABSTRACT

A casing for electric battery that, applicable to an electric battery (2) to house inside a plurality of identical electrochemical cells (3) and including a metal container-shaped box (10), formed by a lower base (101) and a perimetric wall (102), where the cells (3) are incorporated, that in addition includes an upper fixing part (11) that acts as a lid to the box (10) fitted on its perimetric wall (102) and on the cells (3) centering them and leaving the contacts or lugs apparent for the electric connection. An upper fixing part (11) can include housings (7) with holes that, distributed through the full extent of the part, have a number, shape and size adapted to receive an upper portion of each of the cells (3) so that they surround each cell (3) leaving apparent and insulated from one another their positive and negative contacts.

14 Claims, 3 Drawing Sheets

(51) Int. Cl.
    *H01M 50/213* (2021.01)
    *H01M 50/224* (2021.01)
    *H01M 50/249* (2021.01)
    *H01M 50/291* (2021.01)
    *H01M 50/293* (2021.01)
    *H01M 50/588* (2021.01)
    *H01M 50/593* (2021.01)

(56) References Cited

U.S. PATENT DOCUMENTS

2016/0276637 A1\* 9/2016 Kusaba ............... H01M 50/291
2020/0220122 A1\* 7/2020 Haertel ............... H01M 50/505

\* cited by examiner

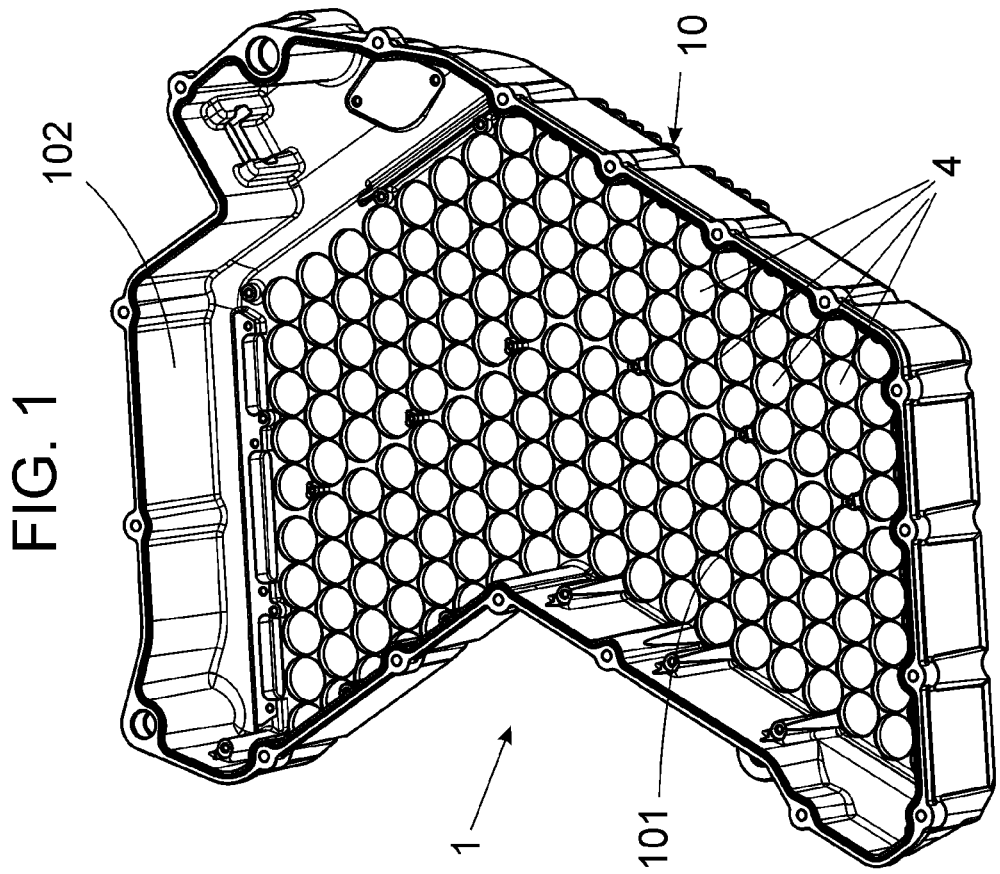

CASING FOR ELECTRIC BATTERY

OBJECT OF THE INVENTION

The invention, as stated in the title of this specification, refers to a casing for electric battery, contributing, to the function to which it is designed, with advantages and characteristics that are disclosed in detail thereafter.

The object of this invention falls on a casing for electric battery, in particular an electric battery, for example for motorcycles or similar electric vehicles, of those formed by a metal box that houses a plurality of electrochemical cells that, conveniently connected, convert the chemical elements that they store into electric current, which is essentially distinguished in that it comprises an upper securing part that, having the size to fit on the perimetric wall of the said container-shaped box of the casing, serves for securing and centering the cells as well as for their insulation, for which they present housings with holes, preferably circular as well as the cells, that surround the upper base of each cell and that only leave their contacts apparent, necessary for the electric connection.

FIELD OF APPLICATION OF THE INVENTION

The field of application of this invention is within the sector of the industry engaged in manufacturing electric batteries, in particular focusing in the field of the cell electric batteries.

BACKGROUND OF THE INVENTION

In the market, cell electric batteries are known of the type involved herein, that means, formed by a casing that is internally housing a plurality of electrochemical cells connected to produce electric current, the number of cells of which is irrelevant. For example, for the case of batteries designed to electric motorcycles, the number of cells can be around 200.

This type of batteries, in order that their operation is optimal, must correctly dissipate the heat generated by the cells. Currently, the dissipation of the heat generated by the cells is carried out by radial conduction as on the upper and lower faces of the cells, connections exist that hinder cooling by the axial axis.

In addition, the batteries must have all the cells correctly placed in order that, after, the connection arcs can be done, for example, by means of a computerized robot. Currently, the correct placement of the cells is carried out by means of an element that fixes the cells to each other by the cells central area, leaving their ends free (upper and lower faces) for their connection.

The objective of this invention is, therefore, to provide a casing specially designed to improve the heat transfer from the cell outwards as well as a means to facilitate the cells correct securing and placement of the cells further connection (sic).

On the other hand, and as reference to the current state-of-the-art, at least the applicant is not aware of the existence of any other casing for electric battery presenting technical and structural characteristics same or similar to those of that herein claimed.

EXPLANATION OF THE INVENTION

The casing for electric battery that the invention proposes is configured as the suitable solution to the above-mentioned objective, the characterizing details making it possible and that distinguish it conveniently appearing in the final claims attached to this description.

Concretely, what the invention proposes, as it was said before, is a casing for electric battery, in particular an electric battery, for example for motorcycles or similar electric vehicles, of those formed by a metal box that houses a plurality of identical electrochemical cells, which is essentially distinguished in that it comprises an upper securing part that, having sizes to fit on the perimetric wall of the said container-shaped box of the casing, serves for securing and centering the cells as well as for insulating them, for which it presents housings provided with holes, preferably circular as well as the cells, that surround the upper base of each cell and that only leave its contacts apparent, necessary for the electric connection.

This upper fixing part, that is fixed perimetrically to the box of the casing, serves for centering the cells by their upper part so that all the cells remain perfectly parallel to each other with the same gap, as well as for closing the structure that supports the cells and for insulating the positive pole from the negative pole and only leaving a part for its connection apparent or accessible.

For this, preferably, each circular housing of the upper fixing part presents a central hole coinciding with the lug of the cells upper base, that constitutes their positive pole or anode, and a lateral hole, provided on the circular surface existing between the said central hole and the perimetric wall of the slot, that leaves apparent at least a portion of the perimetric edge of each cell and that constitutes the negative pole or cathode.

In addition, in a preferred embodiment of the invention, the upper securing part of the casing likewise presents cones that emerge around the said circular housings and that act as guide fingers to assist to centering the set of all the cells at their correct position. As there is a great number of cells (approximately 200), their individual centering is very difficult, thus, preferably, the said centering element is required to facilitate centering all of them as a whole.

The electronic plate is placed on the plate and a robot proceeds to electrically joining the positive and negative poles of each cell through the holes provided in the part with the electronic plate.

Optionally, the container-shaped box, that comprises a lower base and a perimetric wall, within which the electrochemical cells are incorporated, that are preferably cylindric, presents a series of slots on its internal surface, machined by means of milling the material on the said surface, that encompass its full extent and have the shape, size and gap adapted to receive a portion of the lower part of each cell so that the said cells also remain secured by the side opposite to the upper fixing part and separated from each other by a same gap.

As it has been said, preferably, the cells are cylindric and therefore, in the preferred embodiment, the slots of the internal surface of the base of the container-shaped box of the casing are also circular and with a diameter in line with the diameter of the cells.

In addition, preferably, the cells fit in each of the said slots by means of the use of centering parts, which present a sort of bowl of plastic material, provided with a lower hole and slotted walls that endow them with a certain flexibility, they are interposed at the lower part of the cells between them and the housing that each slot defines, allowing to achieve an improved adjustment of each cell in the related slot.

Last, it shall be pointed out that, preferably, between the lower base of the cells and the housing defined by the slots of the internal surface of the base of the box of the casing, either if the centering parts are included or not, it is foreseen to incorporate a glue to assure a best fixation of the cells, which has an electric high voltage insulating composition and a low resistance to the heat dissipation, such to allow the heat conduction between the cells and the casing to favor the evacuation of the heat generated by the cells towards the base of the casing.

DESCRIPTION OF THE DRAWINGS

To complement the description being carried out and in order to assist to best understanding the characteristics of the invention, attached to this specification, as an integral part thereof, there is a set of drawings in which, for illustration and no limitation purpose, the following has been represented:

FIG. 1.—It shows a schematic top view in perspective of an example of embodiment of the container-shaped box that comprises the casing for electric battery object of the invention, its configuration can be seen, especially the slots provided on the internal surface of the base of the said box;

FIG. 2.—It shows a schematic view in perspective of an example of the centering part that is incorporated in each cell to facilitate centering in the slots of the box, which has been represented in an independent manner, its general configuration and main parts can be seen;

FIG. 3.—It shows an example of a cell of the battery with the centering part incorporated at its lower base;

PREFERRED EMBODIMENT OF THE INVENTION

Figure 4:
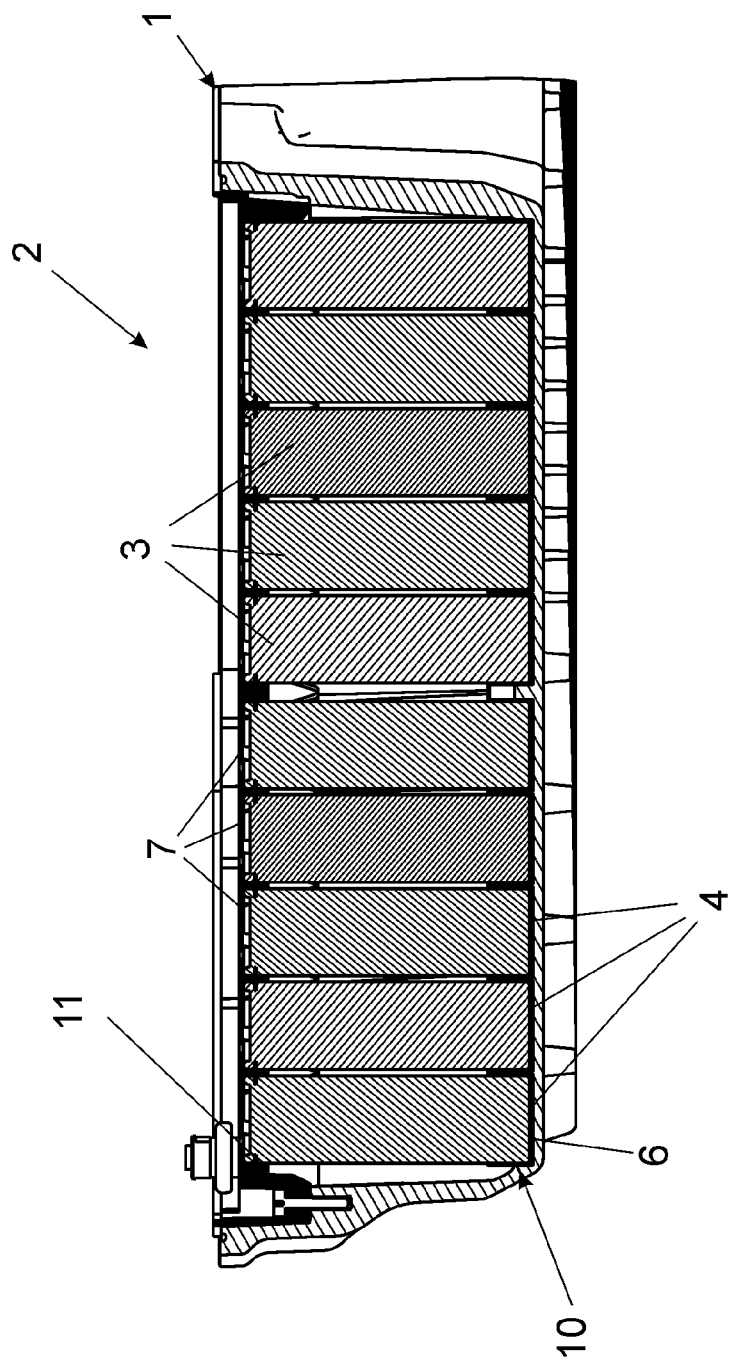
FIG. 4.—It shows a sectional view, according to a vertical cross section, of an example of the battery to which the casing object of the invention is designed, the arrangement of the cells in the slots of the box can be seen as well as the upper securing part.

Seen the said figures, and according to the numerals adopted, a non-limiting example of embodiment of the casing for electric battery of the invention can be seen which comprises what is disclosed in detail thereafter.

Thus, as it can be seen in the said figures, the casing (1) of the invention applicable to an electric battery (2) to house inside a plurality of identical electrochemical cells (3), essentially comprises a lower metal container-shaped box (10), formed by a lower base (101) and a perimetric wall (102), where the cells (3) are incorporated, and an upper fixing part (11) that acts as a lid to the box (10) fitted on the perimetric wall (102) of the box (10) and on the cells (3) serves for fixing and centering the cells (3) as well as for their insulation, leaving only the contacts apparent, for the electric connection.

Figure 6:
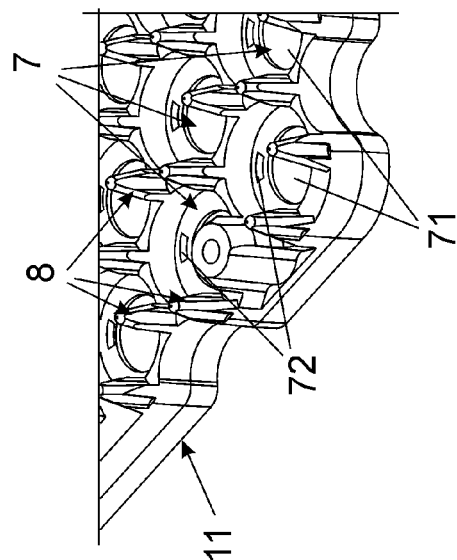
FIG. 6.—It shows an enlarged view of the detail A appearing in the FIG. 5 and that allows to appreciate with higher accuracy the configuration and parts of the upper securing part.
Figure 5:
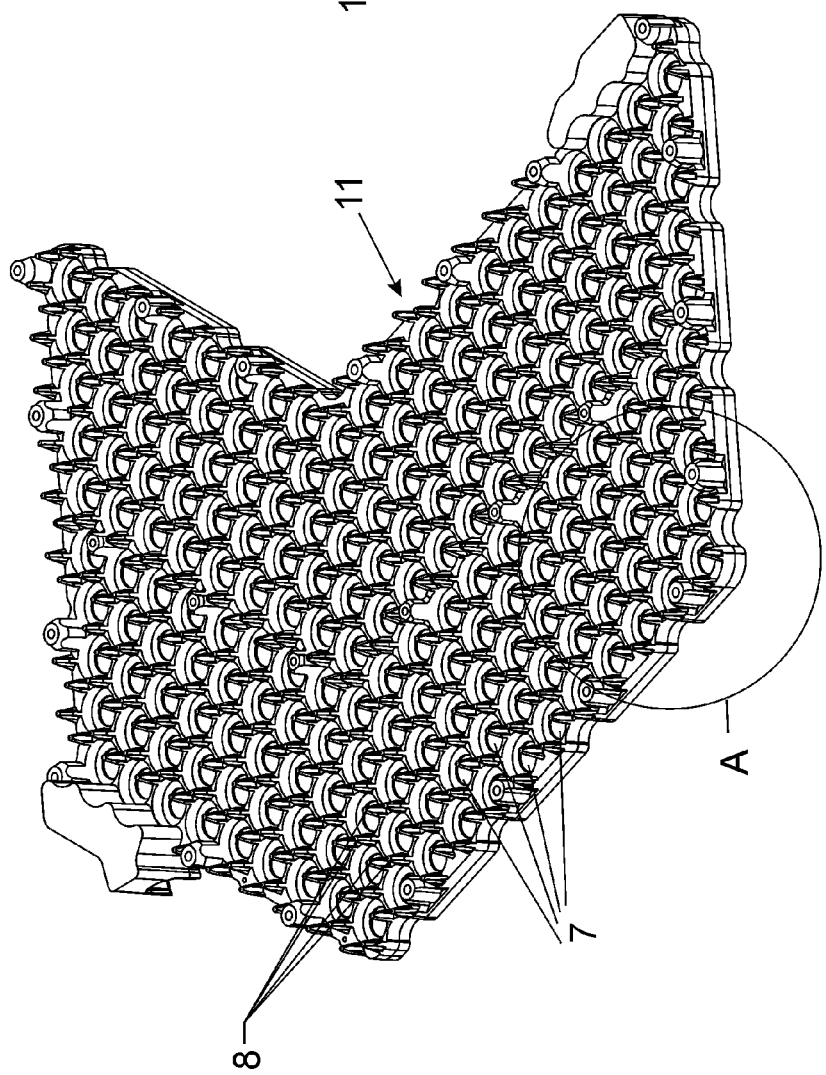
FIG. 5.—It shows a schematic view in perspective of an example of the upper securing part that comprises the casing, according to the invention, which has been represented in inverted position to facilitate watching its main parts.

For this, the said fixing part (11), as it can be seen in the FIGS. 5 and 6, presents a plurality of housings (7) with holes that, distributed through the full extent of the said part, present a number, shape and size adapted to receive an upper portion of each of the cells (3) so that they surround each cell (3) leaving apparent and insulated to each other their positive and negative contacts necessary for the electric connection.

Preferably, the cells (3) are cylindric and the housings (7) of the upper fixing part (11) are circular and having a diameter in line with the diameter of the said cylindric cells (3).

In addition, preferably, each circular housing (7) of the upper fixing part (11) presents a central hole (71) coinciding with the lug (31) of the cells (3) upper base, that constitutes their positive pole or anode and a lateral hole (72) that leaves apparent at least a portion of the perimetric edge (32) of each cell (3) and that constitutes the negative pole or cathode. In the detail of the FIG. 6, the said central (71) and lateral (72) holes of the housings (7) of the upper fixing part (11) can be clearly seen while in the FIG. 3, the lug (31) and the perimetric edge (32) of each of the cells (3) can be seen.

Anyway, preferably, the upper securing part (11) of the casing (1) in addition presents centering cones (8) that emerge around the housings (7) as guide fingers with the aim to assist to centering the set of all the cells (3) of the battery (2).

In a preferred embodiment, the said cones (8) have a rounded vortex and a tilt of their conical surface of around 15° with respect to their base, to favor the said centering function. In the FIG. 6, the said configuration of the said cones (8) can be seen.

On the other hand, in an optional embodiment of the invention, the lower base (101) of the metal box (10) of the casing (1), as shown in the FIG. 1, internally presents a plurality of identical slots (4), preferably obtained by machining by means of milling in the material forming the said base, that are distributed on the full extent of its surface and that possess a number, shape and size adapted to receive a lower portion of each of the cells (3), so that each of the cells (3) of the battery remains in turn secured in one of the slots (4) and separated to each other with a regular gap between them.

Preferably, as it was said before, the casing (1) is designed to a battery of cylindric cells (3), therefore the slots (4) of the internal surface of the base (101) of the box that forms the casing also have a circular configuration and a diameter in line with the diameter of the cells (3). In an example of embodiment, the battery (2) includes up to 200 cells (3).

In addition, preferably, each of the cells (3) of the battery (2) is fitted in each of the said slots (4) of the box (10) of the casing (1) by means of the inclusion of a centering part (5).

The said centering part (5) preferably consists of a plastic material part, as it can be seen in the FIGS. 2 and 3, preferably it is formed by a bowl-shaped body with a base centrally provided with a hole (51), that leaves the base of the cell (3) accessible, and a perimetric wall divided in different lengths (52) by open slots (53) up to the end, so that it endows it a given flexibility, allowing to achieve an improved adjustment of each cell (3) in the related slot (4) of the box (10) of the casing (1).

Last, it shall be pointed out that, optionally, between the lower base of the cells (3) and the housing defined by the slots (4) of the internal surface of the base (101) of the box (10) of the casing (1), either if the centering part (5) is included or not, it is foreseen to incorporate a hot glue (6) to assure a best fixation of the cells (3), which is an electrical insulator and heat conductor to favor the evacuation of the heat generated by the cells (3) towards the base (101) of the box (10).

Sufficiently disclosed the nature of this invention, as well as the manner of implementing it, it is not deemed necessary to extend anymore its explanation in order that any person skilled in the art understands its extends and the advantages arising from it.

The invention claimed is:

1. A casing for an electric battery (2) to house inside a plurality of identical electrochemical cells (3) and comprising a metal container-shaped box (10), formed by a lower base (101) and a perimetric wall (102), where the plurality of identical electrochemical cells (3) are incorporated, characterized in that an upper fixing part (11) is configured to act as a lid to the metal container-shaped box (10) fitting on the perimetric wall (102) and on the plurality of identical electrochemical cells (3) centering the plurality of identical electrochemical cells (3) and only leaving a contact or a lug of the plurality of identical electrochemical cells (3) thereof configured for electric connection, wherein the plurality of identical electrochemical cells (3) are cylindric and the plurality of housings (7) of the upper fixing part (11) are circular and having a diameter in line with the plurality of identical electrochemical cells (3) and each of the plurality of holed housings (7) of the upper fixing part (11) presents a central hole (71) coinciding with a lug of an upper base of one of the plurality of identical electrochemical cells (3), that constitutes a positive pole thereof, and a lateral hole (72) that leaves apparent at least a portion of through a perimetric edge (32) of the same cell that the central hole (71) of each cell of the plurality of identical electrochemical cells (3) and that constitutes the negative pole thereof.

2. The casing for an electric battery, according to claim 1, characterized in that the upper fixing part (11) comprises a plurality of housings (7) provided with holes that have a number, shape and size configured to receive an upper portion of each of the plurality of identical electrochemical cells (3) so that the plurality of holed housings (7) surround each of the plurality of identical electrochemical cells (3) leaving apparent and insulated from one another positive and negative contacts of each of the plurality of identical electrochemical cells (3).

3. The casing for an electric battery, according to claim 2 characterized in that, an upper fixing part (11) presents centering cones (8) that emerge protruding around each of the plurality of holed housings (7) as guide fingers.

4. The casing for an electric battery, according to claim 3 characterized in that, the cones (8) each have a rounded vortex and a tilt of conical surface of around 15° with respect to a cone base.

5. The casing for an electric battery, according to claim 1, characterized in that the lower base (101) of the metal container-shaped box (10) internally comprises a plurality of identical slots (4), that are distributed on a full extent of a surface of the metal container-shaped box (10) and that possess a number, shape and size configured to receive a lower portion of each of the plurality of identical electrochemical cells (3), so that each of the plurality of identical electrochemical cells (3) of the battery remains secured in one of the plurality of identical slots (4) and separated from each other by a regular gap therebetween.

6. The casing for an electric battery, according to claim 5, characterized in that the plurality of identical slots (4) of an internal surface of the lower base (101) of the metal container-shaped box (10) are obtained by machining.

7. The casing for an electric battery, according to claim 5, characterized in that each of the plurality of identical electrochemical cells (3) of the battery (2) fits in each of the plurality of identical slots (4) of the metal container-shaped box (10) of the casing (1) by inclusion of a centering part (5).

8. The casing for an electric battery, according to claim 1, characterized in that, between the lower base of the plurality of identical electrochemical cells (3) and a housing defined by the plurality of identical slots (4) of an internal surface of the lower base (101) of the metal container-shaped box (10) of the casing (1), comprises hot glue (6).

9. The casing for an electric battery, according to claim 1, characterized in that a plurality of identical electrochemical cells (3) are cylindric, and a plurality of identical slots (4) of an internal surface of the lower base (101) of metal container-shaped box (10) have a circular configuration and with a diameter in line with the diameter of the plurality of identical electrochemical cells (3).

10. The casing for an electric battery, according to claim 6, wherein the machining is-milling material forming the lower base (101).

11. The casing for an electric battery, according to claim 6, characterized in that each of the plurality of identical electrochemical cells (3) of the battery (2) fits in each of the plurality of identical slots (4) of the metal container-shaped box (10) of the casing (1) by inclusion of a centering part (5).

12. The casing for an electric battery, according to claim 7, characterized in that, between a lower base of the plurality of identical electrochemical cells (3) and the housing defined by the plurality of identical slots (4) of an internal surface of the lower base (101) of the metal container-shaped box (10) of the casing (1), comprises hot glue (6).

13. A casing for an electric battery, (2) to house inside a plurality of identical electrochemical cells (3) and comprising a metal container-shaped box (10), formed by a lower base (101) and a perimetric wall (102), where the plurality of identical electrochemical cells (3) are incorporated, characterized in that:

an upper fixing part (11) is configured to act as a lid to the metal container-shaped box (10) fitting on the perimetric wall (102) and on the plurality of identical electrochemical cells (3) centering the plurality of identical electrochemical cells (3) and only leaving a contact or a lug of the plurality of identical electrochemical cells (3) thereof configured for electric connection, the lower base (101) of the metal container-shaped box (10) internally comprises a plurality of identical slots (4), that are distributed on a full extent of a surface of the metal container-shaped box (10) and that possess a number, shape and size configured to receive a lower portion of each of the plurality of identical electrochemical cells (3), so that each of the plurality of identical electrochemical cells (3) of the battery remains secured in one of the plurality of identical slots (4) and separated from each other by a regular gap therebetween, each of the plurality of identical electrochemical cells (3) of the battery (2) fits in each of the plurality of identical slots (4) of the metal container-shaped box (10) of the casing (1) by inclusion of a centering part (5), and a centering part (5) is formed by a bowl-shaped body with a base centrally provided with a hole (51), that leaves a base of each cell of the plurality of identical electrochemical cells (3) accessible, and the perimetric wall divided in different lengths (52) by open slots (53) up to an end.

14. The casing for an electric battery, according to claim 13, characterized in that the centering part (5) is formed of plastic material.

* * * * *